(12) United States Patent
Yee et al.

(10) Patent No.: US 12,612,939 B2
(45) Date of Patent: Apr. 28, 2026

(54) COMPUTING DEVICE HINGE

(71) Applicant: Microsoft Technology Licensing, LLC, Redmond, WA (US)

(72) Inventors: Christina Ashley Yee, Redmond, WA (US); Brian David Bitz, Woodinville, WA (US); Joseph Benjamin Gault, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 17/914,684

(22) PCT Filed: Mar. 25, 2020

(86) PCT No.: PCT/US2020/024692
§ 371 (c)(1),
(2) Date: Sep. 26, 2022

(87) PCT Pub. No.: WO2021/194484
PCT Pub. Date: Sep. 30, 2021

(65) Prior Publication Data
US 2023/0129909 A1 Apr. 27, 2023

(51) Int. Cl.
*G06F 1/16* (2006.01)
*F16C 11/04* (2006.01)
*E05D 3/14* (2006.01)

(52) U.S. Cl.
CPC .............. *F16C 11/04* (2013.01); *G06F 1/162* (2013.01); *G06F 1/1681* (2013.01); *E05D 3/14* (2013.01); *E05Y 2999/00* (2024.05)

(58) Field of Classification Search
CPC ............ G06F 1/1613; F16M 2200/063; F16M 11/2014
See application file for complete search history.

(56) References Cited

U.S. PATENT DOCUMENTS

| | | |
|---|---|---|
| 5,489,924 A | 2/1996 | Shima |
| 5,564,163 A | 10/1996 | Lowry et al. |
| 5,644,469 A | 7/1997 | Shioya |
| 6,266,236 B1 | 7/2001 | Ku et al. |
| 6,464,195 B1 | 10/2002 | Hildebrandt |

(Continued)

FOREIGN PATENT DOCUMENTS

| | | |
|---|---|---|
| CN | 201301889 Y | 9/2009 |
| CN | 101672322 A | 3/2010 |

(Continued)

OTHER PUBLICATIONS

Non-Final Office Action mailed on Sep. 28, 2024, in U.S. Appl. No. 17/790,914, 09 pages.

(Continued)

*Primary Examiner* — Anthony Q Edwards
(74) *Attorney, Agent, or Firm* — Ray Quinney & Nebeker P.C.; John O. Carpenter

(57) ABSTRACT

A computing device includes a four-body hinge. A base member is connected to a base and an upper member is connected to a display. A first linkage and a second linkage are connected to the base member and the upper member. As the display moves relative to the base, the four-body hinge resists rotation of the display, thereby stabilizing the display during use by the user.

19 Claims, 6 Drawing Sheets

(56) References Cited

U.S. PATENT DOCUMENTS

| | | | |
|---|---|---|---|
| 6,826,043 | B2 | 11/2004 | Chang |
| 7,061,753 | B2 * | 6/2006 | Michoux .............. F16M 11/24 248/371 |
| 7,403,378 | B2 | 7/2008 | Lo et al. |
| 7,478,786 | B2 * | 1/2009 | Copeland ................ F21V 21/26 248/280.11 |
| 7,742,285 | B2 | 6/2010 | Ishikura |
| 8,074,323 | B2 | 12/2011 | Lin |
| 8,253,648 | B2 | 8/2012 | Nagai |
| 8,908,364 | B2 | 12/2014 | Tseng et al. |
| 8,914,946 | B2 | 12/2014 | Hsu et al. |
| 9,107,301 | B2 | 8/2015 | Pan |
| 9,261,906 | B2 | 2/2016 | Arima |
| 9,291,299 | B2 * | 3/2016 | Richard ................. F16M 11/24 |
| 9,405,325 | B2 | 8/2016 | Kim |
| 9,523,226 | B1 | 12/2016 | Lam et al. |
| 9,557,778 | B2 | 1/2017 | Sung |
| 9,644,412 | B2 | 5/2017 | Novin |
| 9,791,674 | B1 | 10/2017 | Topliss |
| 9,927,844 | B2 | 3/2018 | Park |
| 10,025,348 | B2 | 7/2018 | Arima |
| 10,061,360 | B1 | 8/2018 | Magi et al. |
| 10,151,128 | B2 | 12/2018 | Hatano |
| 10,324,501 | B1 | 6/2019 | Zimmerman et al. |
| 10,407,957 | B1 | 9/2019 | Camp et al. |
| 10,474,203 | B2 | 11/2019 | Tazbaz et al. |
| 10,558,245 | B2 | 2/2020 | Morrison et al. |
| 10,648,212 | B2 | 5/2020 | Novin |
| 10,761,571 | B1 * | 9/2020 | Cooper ................. G06F 1/1681 |
| 10,852,765 | B2 | 12/2020 | Sanchez |
| 10,996,710 | B2 * | 5/2021 | Park ........................ G06F 1/166 |
| 11,008,789 | B2 | 5/2021 | Hatano |
| 11,106,249 | B1 | 8/2021 | Zimmerman |
| 11,237,643 | B2 | 2/2022 | Kulkarni |
| 11,507,145 | B2 | 11/2022 | Nakamura |
| 11,573,611 | B2 | 2/2023 | Channaiah |
| 2004/0021051 | A1 * | 2/2004 | Chiu ....................... F16M 11/24 248/371 |
| 2005/0138775 | A1 * | 6/2005 | Oakley ................. G06F 1/1681 16/368 |
| 2006/0211457 | A1 | 9/2006 | Otsuka |
| 2006/0288258 | A1 | 12/2006 | Lo |
| 2007/0058329 | A1 * | 3/2007 | Ledbetter .............. G06F 1/1677 361/679.06 |
| 2007/0183123 | A1 | 8/2007 | Chuan |
| 2008/0094792 | A1 | 4/2008 | Chen |
| 2008/0271288 | A1 | 11/2008 | Senatori |
| 2011/0312392 | A1 | 12/2011 | Reeves et al. |
| 2012/0124775 | A1 | 5/2012 | Ceci |
| 2013/0160244 | A1 | 6/2013 | Sayama |
| 2013/0318746 | A1 | 12/2013 | Kuramochi |
| 2014/0026368 | A1 | 1/2014 | Katsuta |
| 2014/0043736 | A1 | 2/2014 | Onda |
| 2014/0157546 | A1 | 6/2014 | Ho et al. |
| 2014/0165334 | A1 | 6/2014 | Liu |
| 2014/0338483 | A1 | 11/2014 | Hsu et al. |
| 2014/0375194 | A1 | 12/2014 | Arima |
| 2014/0375196 | A1 | 12/2014 | Nguyen |
| 2015/0002998 | A1 * | 1/2015 | Arima ................... G06F 1/1681 345/173 |
| 2015/0077915 | A1 * | 3/2015 | Saito ................... F16M 11/2021 361/679.22 |
| 2015/0121654 | A1 | 5/2015 | Novin |
| 2015/0185786 | A1 * | 7/2015 | Yeh ........................ F16M 11/10 361/679.55 |
| 2016/0147267 | A1 | 5/2016 | Bitz et al. |
| 2016/0327994 | A1 | 11/2016 | Lee |
| 2017/0097657 | A1 | 4/2017 | Hampton et al. |
| 2017/0208703 | A1 | 7/2017 | Lin |
| 2017/0218672 | A1 | 8/2017 | Novin |
| 2018/0044958 | A1 | 2/2018 | Tazbaz et al. |
| 2018/0059735 | A1 | 3/2018 | Tazbaz et al. |
| 2018/0066465 | A1 | 3/2018 | Tazbaz et al. |
| 2018/0088634 | A1 | 3/2018 | Bitz |

| | | | |
|---|---|---|---|
| 2018/0112447 | A1 | 4/2018 | Hatano |
| 2018/0188781 | A1 | 7/2018 | Park, Jr. |
| 2018/0209473 | A1 | 7/2018 | Park et al. |
| 2019/0011957 | A1 | 1/2019 | Wendt |
| 2019/0029135 | A1 | 1/2019 | Park et al. |
| 2019/0064886 | A1 | 2/2019 | Wendt |
| 2019/0243426 | A1 | 8/2019 | Morrison et al. |
| 2020/0040626 | A1 | 2/2020 | Hatano |
| 2020/0233459 | A1 | 7/2020 | Sanchez |
| 2021/0289644 | A1 * | 9/2021 | Zarnowitz ............ F16M 11/048 |
| 2022/0057844 | A1 | 2/2022 | Nakamura |
| 2023/0034612 | A1 | 2/2023 | Hillyerd et al. |
| 2023/0049295 | A1 | 2/2023 | Hillyerd |
| 2023/0049811 | A1 | 2/2023 | Krahn |
| 2023/0084038 | A1 | 3/2023 | Yee |
| 2023/0123520 | A1 | 4/2023 | Yee |
| 2024/0111330 | A1 | 4/2024 | Yu |
| 2024/0111339 | A1 | 4/2024 | Sun |

FOREIGN PATENT DOCUMENTS

| | | |
|---|---|---|
| CN | 102572029 A | 7/2012 |
| CN | 103291163 A | 9/2013 |
| CN | 103576772 A | 2/2014 |
| CN | 104765412 A | 7/2015 |
| CN | 104767843 A | 7/2015 |
| CN | 204553526 U | 8/2015 |
| CN | 107771308 A | 3/2018 |
| CN | 109564449 A | 4/2019 |
| CN | 109643144 A | 4/2019 |
| CN | 110168470 A | 8/2019 |
| CN | 110226149 A | 9/2019 |
| CN | 108691470 A | 9/2021 |
| EP | 2397929 A1 | 12/2011 |
| EP | 2557473 A1 | 2/2013 |
| EP | 2615331 A1 | 7/2013 |
| EP | 2696255 A2 | 2/2014 |
| EP | 2911030 A2 | 8/2015 |
| EP | 3069208 A1 | 9/2016 |
| GB | 931284 * | 7/1963 |
| GB | 931284 A | 7/1963 |
| WO | 2010015931 A2 | 2/2010 |

OTHER PUBLICATIONS

Office Action Received for Chinese Application No. 202080092254. 4, mailed on Aug. 29, 2024, 9 pages. (English Translation Provided).

Office Action Received for Chinese Application No. 202080099092. 7, mailed on Nov. 21, 2024, 15 Pages (English Translation Provided).

First Office Action Received for Chinese Application No. 202080099087.6, mailed on Aug. 17, 2024, 17 pages (English Translation Provided).

Non-Final Office Action mailed on Aug. 27, 2024, in U.S. Appl. No. 17/790,926, 9 pages.

Non-Final Office Action mailed on Aug. 28, 2024, in U.S. Appl. No. 17/793,624, 12 pages.

"International Search Report and Written Opinion Issued in PCT Application No. PCT/US20/014025", Mailed Date: Oct. 9, 2020, 14 Pages.

"International Search Report and Written Opinion Issued in PCT Application No. PCT/US20/024692", Mailed Date: Dec. 11, 2020, 15 Pages.

"International Search Report and Written Opinion Issued in PCT Application No. PCT/US20/024700", Mailed Date: Nov. 23, 2020, 12 Pages.

"International Search Report and Written Opinion Issued in PCT Application No. PCT/US20/040030", Mailed Date: Oct. 9, 2020, 13 Pages.

"International Search Report and Written Opinion Issued in PCT Application No. PCT/US20/040031", Mailed Date: Dec. 2, 2020, 17 Pages.

"Invitation To Pay Additional Fees Issued in PCT Application No. PCT/US20/040031", Mailed Date: Oct. 7, 2020, 10 Pages.

(56)         References Cited

OTHER PUBLICATIONS

Office Action Received for Chinese Application No. 202080092254. 4, mailed on Dec. 11, 2023, 11 pages (English Translation Provided).

Office Action received for Chinese Application No. 202080092255. 9, mailed on Dec. 1, 2023, 16 Pages (English Translation Provided).

Office Action Received for Chinese Application No. 202080093593. 4, mailed on Dec. 28, 2023, 11 pages.

Communication pursuant to Article 94(3) EPC, Received for European Application No. 20720607.9, mailed on Jul. 5, 2024, 8 pages.

Communication under Rule 71(3) received in European Application No. 20719884.7, mailed on Jun. 18, 2024, 8 pages.

Second Office Action Received for Chinese Application No. 202080092255.9, mailed on May 23, 2024, 11 pages. (English Translation Provided).

U.S. Appl. No. 17/790,914, filed Jul. 5, 2022.

U.S. Appl. No. 17/793,624, filed Jul. 18, 2022.

U.S. Appl. No. 17/790,926, filed Jul. 5, 2022.

U.S. Appl. No. 17/914,640, filed Sep. 26, 2022.

Communication pursuant to Article 94(3) Received in European Patent Application No. 20743461.4, mailed on Jan. 16, 2025, 8 pages.

Communication pursuant to Article 94(3) Received in European Patent Application No. 20743462.2, mailed on Dec. 10, 2024, 5 pages.

Decision on Rejection Received for Chinese Application No. 202080092255.9, mailed on Jan. 13, 2025, 8 pages (English Translation Provided).

Decision to Grant pursuant to Article 97(1) Received for European Application No. 20719884.7, mailed on Oct. 24, 2024, 02 pages.

Final office action mailed on Jan. 16, 2025, in U.S. Appl. No. 17/790,914, 15 pages.

Notice of grant Received for Chinese Application No. 202080093593. 4, mailed on May 10, 2024, 4 pages.

Notice of Grant Received for Chinese Application No. 202080099087. 6, mailed on Feb. 8, 2025, 9 pages (English Translation Provided).

Communication under Rule 71(3) EPC Received for European Application No. 20707880.9, mailed on Mar. 5, 2025, 08 pages.

Communication Under Rule 71(3) EPC, Received in European Patent Application No. 20743462.2, mailed on May 14, 2025, 08 pages.

Decision to grant a European patent pursuant to Article 97(1) EPC, Received in European Patent Application No. 20743462.2, mailed on Jul. 31, 2025, 03 pages.

Decision to Grant pursuant to Article 97(1) received in European Application No. 20707880.9, mailed on Jul. 3, 2025, 2 pages.

Examination report Received for Indian Application No. 202247046431, mailed on Jun. 2, 2025, 7 pages.

Final Office Action mailed on Mar. 13, 2025, in U.S. Appl. No. 17/790,926, 8 pages.

Final Office Action mailed on Mar. 25, 2025, in U.S. Appl. No. 17/793,624, 10 pages.

Non-Final Office Action mailed on Jul. 2, 2025, in U.S. Appl. No. 17/793,624, 14 pages.

Non-Final Office Action mailed on Jul. 22, 2025, in U.S. Appl. No. 17/790,926, 17 pages.

Non-Final Office Action mailed on Jun. 26, 2025 in U.S. Appl. No. 17/914,640, 13 pages.

Notice of Allowance mailed on Apr. 29, 2025, in U.S. Appl. No. 17/790,914, 10 pages.

Second Office Action Received for Chinese Application No. 202080099092.7, mailed on May 16, 2025, 15 Pages (English Translation Provided).

Decision On Rejection Received for Chinese Application No. 202080099092.7, mailed on Sep. 8, 2025, 07 Pages (English Translation Provided).

Notice of Allowance mailed on Aug. 26, 2025, in U.S. Appl. No. 17/790,914, 10 pages.

Notice of Allowance mailed on Oct. 21, 2025, in U.S. Appl. No. 17/914,640, 09 pages.

Final Office Action mailed on Dec. 10, 2025, in U.S. Appl. No. 17/793,624, 12 pages.

Notice of Allowance mailed on Nov. 19, 2025, in U.S. Appl. No. 17/790,926, 12 pages.

* cited by examiner

350

| | |
|---|---|
| Rotating a display about a base along a first rotation path | 352 |
| Rotating the display along a second rotation path | 354 |
| Resisting rotation of the display | 356 |

COMPUTING DEVICE HINGE

CROSS REFERENCE TO RELATED APPLICATIONS

This application is a U.S. Nationalization of PCT Application Number PCT/US2020/024692, filed on Mar. 25, 2020, the entirety of which is incorporated herein by reference.

BACKGROUND

Background and Relevant Art

Computing devices are movable between different positions, such as a closed mode, a laptop mode, a studio mode, and a tablet mode. The computing device moves between each of these positions or modes using one or more hinges. The one or more hinges may place bounds on the range of motion and/or provide resistance to rotation of the display relative to the base.

A user may interact with the computing device when it is in each of these modes. In some situations, as the user interacts with the computing device, such as touching a display, the display may unintentionally rotate.

BRIEF SUMMARY

In some embodiments, a computing device has a display that is supported above a base. A user views and interacts with visual information on the display. In some embodiments, the display is a touch-sensitive display, and a user physically interacts with the surface of the display while the display is supported above the base. Interaction with the display can result in unintended movement or rotation of the display. In some embodiments, a hinge supporting the display above the base allows the display and base to attain a variety of postures and support the display in those postures while a user applies a force to the display surface.

In some embodiments, a computing device includes a base and a display rotatable relative to the base. A hinge connects the base to the display, the hinge including a base member connected to the base, and an upper member connected to the display. A first linkage and a second linkage connect the base member to the upper member. In some embodiments, a connecting member connects the base to the display. In some embodiments, a first linkage cable and a second linkage cable connect the base to the display.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for hinges for computing devices. Computing devices may be used in a variety of modes and/or configurations. In some embodiments, a computing device includes a laptop mode, where a base, such as a keyboard, is located in front of a display, and a viewing angle of the display is convenient for a user to view while typing on a keyboard and seated back from the computing device (such as generally vertically, or between 75° and 105° relative to the plane of the base). In a studio mode, the display may be located over the top of the base and may be convenient for a user to interact with (e.g., touch a touchscreen display using a finger or a stylus). In some embodiments, the computing device further moves into a tablet mode. In the tablet mode, the display may cover an entirety of the base and the display may have a very low angle, such as an angle of less than 10°.

To move between the laptop mode and the studio mode, a lower part of the display (e.g., the part of the display closest to the base) may be disconnected from the base and moved relative to the base. A hinge moves the display relative to the base. The hinge includes a connecting portion that connects the display to the base. In some embodiments, the connecting portion connects to the display at or near a center of the display. Thus, as the display moves relative to the base, the viewing angle of the display may be adjusted.

In some embodiments, the attachment between the connecting portion and the display is not be a rigid connection (e.g., a loose connection). Thus, in the studio mode, the lower part of the display rests on the base. However, a loose connection may cause the display to rotate or "flop" backwards during use or with a force applied to the upper portion of the display. This may be frustrating to the user and may result in unstable interaction with the display and/or stable interaction with the display across only a portion (e.g., the lower portion) of the display.

Figure 1:
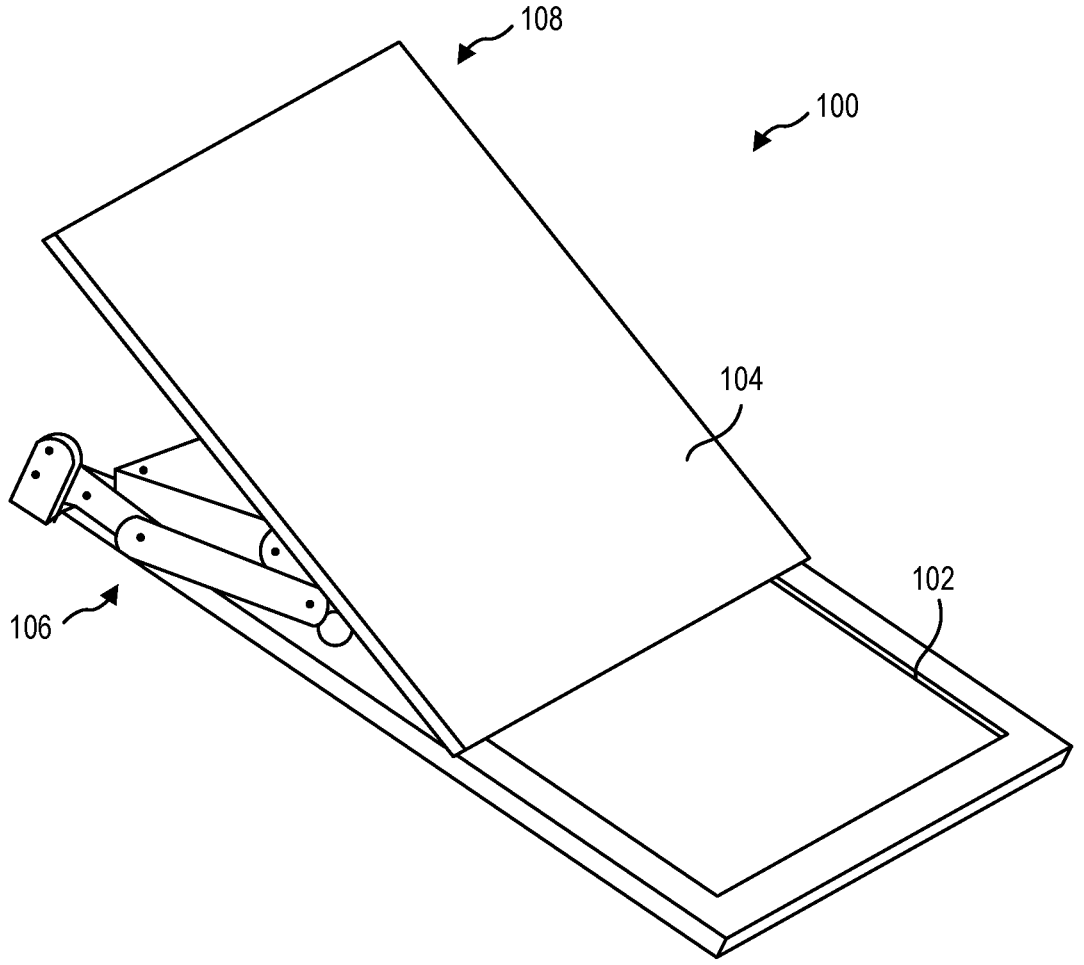
FIG. 1 is a perspective view of a computing device, according to at least one embodiment of the present disclosure.

FIG. 1 is a perspective view of a computing device 100, according to at least one embodiment of the present disclosure. The computing device 100 shown includes a base 102 and a display 104. In some embodiments, the base 102 is any base, such as a platform or a support for the computing device 100. In some embodiments, the base 102 includes one or more input devices, such as a keyboard, a trackpad, a touch-sensitive input, a touchscreen display, other input devices, and combinations thereof. The display 104 may include one or more display devices, including a backlit display, a non-lit display, a touchscreen display, an LCD display, an LED display, and OLED display, a projected display, any other display, and combinations thereof.

In some embodiments, the display 104 is rotatable about the base 102 so that the computing device 100 is movable between multiple different modes or configurations. In some embodiments, the computing device 100 is movable between at least a laptop mode and the studio mode shown in FIG. 1. However, it should be understood that the computing device 100 may be movable between alternative/ additional modes, including an airplane mode, a tablet mode, a closed mode, other modes, and combinations thereof.

In some embodiments, the computing device 100 includes a hinge 106. In some embodiments, the hinge 106 includes a plurality of members that cause the display 104 to rotate about the base 102 with a rotational path. The rotational path allows the display 104 to move such that the computing device 100 moves between different modes based on the position of the display 104 relative to the base 102. In some embodiments, as the computing device 100 moves between modes, an upper portion 108 of the display 104 may tend to rotate back toward the base 102. Thus, when the user interacts with the display 104, the display 104 may unintentionally rotate, making the user's input imprecise, and frustrating the user. In some embodiments, at least part of the rotational path is elliptical.

In some embodiments, the hinge 106 supports the display 104 such that the upper portion 108 of the display 104 does not rotate when the user interacts with the display 104. This may improve the user experience and/or improve the precision of input by the user onto the display.

Figure 2:
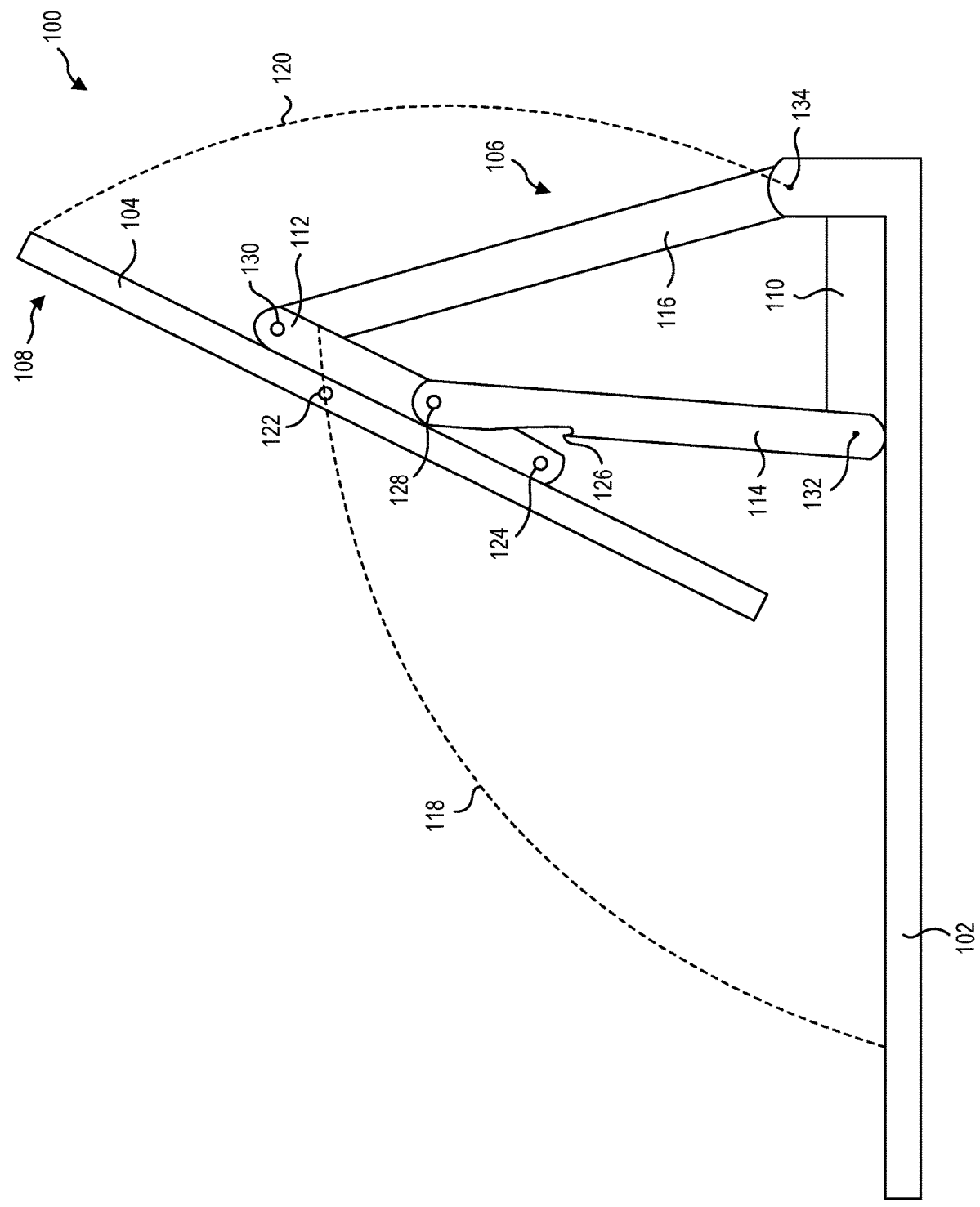
FIG. 2 is a side view of the computing device of FIG. 1 in a laptop mode.

FIG. 2 is a side-view of the computing device 100 of FIG. 1 in the laptop mode, according to at least one embodiment of the present disclosure. In the view shown, the display 104 is oriented relatively vertically, as may typically be used in a laptop computer. In this manner, the one or more input devices on the base 102 may be seen an accessed by the user while simultaneously viewing the display 104 and using the input devices on the base 102.

In some embodiments, the hinge 106 includes four members. In other words, the hinge 106 is a four-body hinge. In some embodiments, the hinge 106 includes a base member 110, an upper member 112, a first linkage 114 and a second linkage 116. The first linkage 114 is rotatably connected to both the base member 110 and the upper member 112 and the second linkage 116 is rotatably connected to both the base member 110 and the upper member 112. Thus, in some embodiments, as the display 104 is moved, the members of the hinge 106 cause the display 104 to move and rotate relative to the base 102. This may cause the computing device 100 to move between different modes (e.g., laptop mode, studio mode).

In the embodiment shown, the base member 110 is fixedly connected to the base 102 and the upper member 112 is fixedly connected to the display 104. Thus, as the display 104 moves relative to the base 102, the first linkage 114 and the second linkage 116 rotate relative to the base member 110 and the upper member 112. In some embodiments, the base member 110 and/or the upper member 112 is rotationally or slidingly connected to the display 104 or the base 102. This changes the path of rotation of the display 104 and change the positions and/or modes available to the computing device.

In the embodiment shown, the first linkage 114 and the second linkage 116 are rigid. In this manner, as the user exerts a force on the upper portion 108 of the display 104, the second linkage 116 may be placed in compression, thereby reducing and/or preventing movement of the upper portion 108 toward the base 102. This may help stabilize the display 104, thereby improving the user experience.

In some embodiments, movement of the display 104 about the hinge 106 causes the display 104 to move with a first rotational path 118 and a second rotational path 120. The first rotational path 118 is the path a center 122 of the display 104 follows during movement of the display 104. The second rotational path 120 is the path the upper portion 108 of the display 104 follows during movement of the display 104. In some embodiments, movement along the first rotational path 118 helps to determine the location of the display 104. In some embodiments, movement along the second rotational path 120 helps to determine the orientation of the display 104. However, it should be understood that the combination of movement along the first rotational path 118 and the second rotational path 120 determines the final position and mode of the computing device 100. In some embodiments, the first rotational path 118 and/or the second rotational path 120 are elliptical. In some embodiments, the first rotational path 118 and/or the second rotational path 120 are circular.

The hinge 106 has a maximum extension. The maximum extension is the maximum extent which the computing device 100 may be opened. In the embodiment shown, the upper member 112 includes a rotation stop 124 and the first linkage 114 includes a stop receiver 126. In some embodiments, as the display 104 rotates toward the maximum extension, the rotation stop 124 is inserted into the stop receiver 126. This may stop movement of the display 104, and prevent the display 104 from over-rotating, which may damage the display 104, the base 102, and/or the hinge 106. In some embodiments, the hinge 106 does not include a rotation stop 124 and a stop receiver 126, and movement of the display may be interrupted by contact of the display 104 with the base 102, interference of members in the hinge 106, other contact of elements in the computing device, and combinations thereof.

In some embodiments, the interaction of the members of the hinge 106 affects the maximum extension. The first linkage 114 connects to the upper member 112 at a first upper member connection 128, and the second linkage 116 connects to the upper member at a second upper member connection 130. The first linkage 114 connects to the base member 110 at a first base member connection 132, and the second linkage 116 connects to the base member 110 at a second base member connection 134. The distance between the first upper member connection 128 and the second upper member connection 130 is the upper member length, and the distance between the first base member connection 132 and the second base member connection 134 is the base member length. In some embodiments, by changing one or both of the upper member length and the base member length, the first rotational path 118 and/or the second rotational path 120 may be changed. Similarly, by changing one or more of the upper member length and the base member length, the maximum extension may be changed. Furthermore, the first rotational path 118, the second rotational path 120, and/or the maximum extension may be changed by changing the length of one or both of the first linkage 114 and the second linkage 116.

Figures 3, 4, 5:
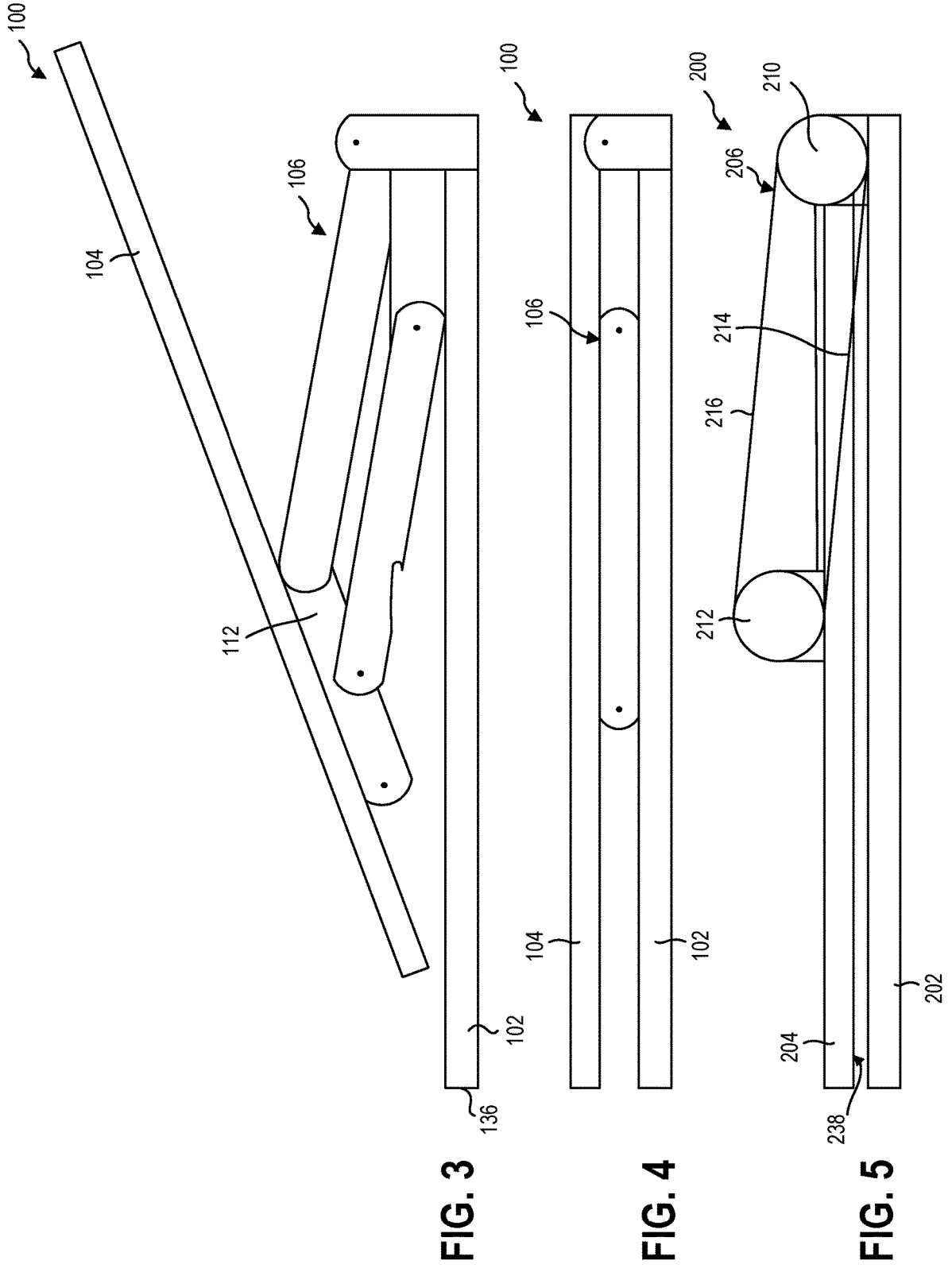
FIG. 3 is a side view of the computing device of FIG. 1 in a studio mode.
FIG. 4 is a side view of the computing device of FIG. 1 in a closed mode.
FIG. 5 is a side view of a computing device in a closed mode, according to at least one embodiment of the present disclosure.

FIG. 3 is a representation of a side-view of the computing device 100 of FIG. 1 in the studio mode, according to at least one embodiment of the present disclosure. The computing device has a maximum retraction, which is the lowest angle into the studio and/or laptop mode that the hinge 106 may travel. As discussed above, changing factors of the hinge 106 may change the maximum retraction, including upper member length, base member length, first linkage length, and second linkage length.

In the studio mode, the display 104 extends over less than an entirety of the base 102. In some embodiments, to extend the display 104 closer to the edge 136 (and even over the edge 136) of the base 102, the upper member 112 includes a sliding connection with the display 104. In this manner, the display 104 slides relative to the base 102. This may move the display 104 closer to the user, which may make interaction with the display 104 easier, thereby improving the user experience.

FIG. 4 is a representation of a side-view of the computing device 100 of FIG. 1 in the tablet mode, according to at least one embodiment of the present disclosure. In the tablet mode shown, the members of the hinge 106 are all aligned so that the display 104 is lying parallel to the base 102. As discussed above, the lengths and/or connection locations of the members of the hinge 106 determine the extent of the maximum retraction of the hinge 106, in some embodiments, even sufficient for the hinge 106 to lay flat in the tablet mode.

FIG. 5 is a side view of a computing device 200, according to at least one embodiment of the present disclosure. In the embodiment shown, the computing device 200 is in a closed mode. In the closed mode, a display 204 has a display surface 238 that faces the base 202. The display 204 rotates relative to the base 202 about a hinge 206.

In some embodiments, the hinge 206 includes an upper member 212 connected to the display 204 and a base member 210 connected to the base 202. In some embodiments, a first linkage 214 is connected to the upper member 212 and the base member 210, and a second linkage 216 is connected to the upper member 212 and the base member 210. In the embodiment shown, the first linkage 214 and the second linkage 216 are cables. Thus, the tension in the first linkage cable 214 and the second linkage cable 216 helps to prevent the display 204 from rotating.

Figure 6:
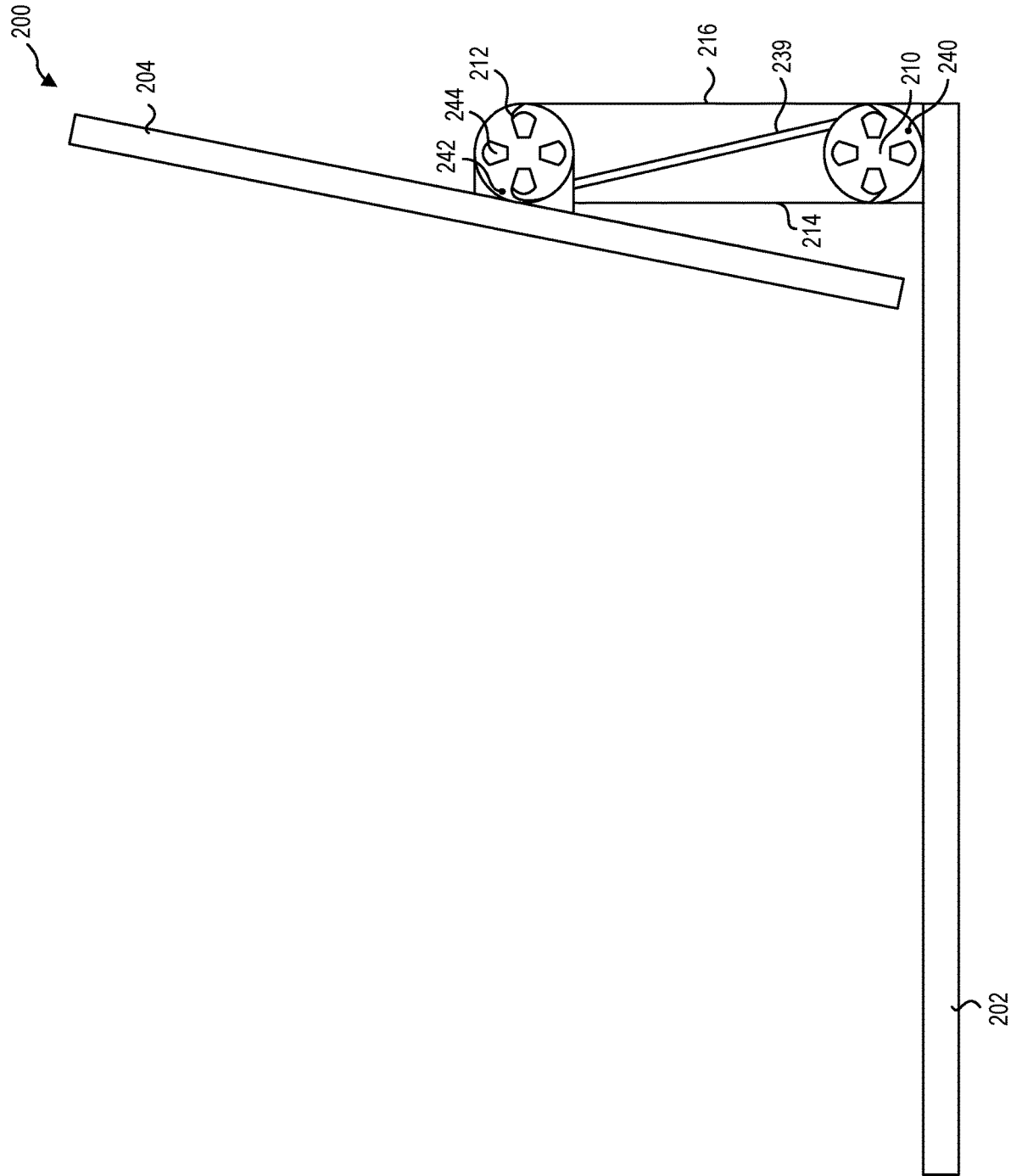
FIG. 6 is a side view of the computing device of FIG. 5 in a laptop mode.

FIG. 6 is a representation of the computing device 200 of FIG. 5 in the laptop mode, according to at least one embodiment of the present disclosure. In the position shown, the display 204 has moved relative to the base 202. The display 204 is connected to the base 202 with a connecting member 239. In some embodiments, the connecting member 239 includes a board and/or one or more bars. The connecting member 239 connects to the base 202 with a base rotatable connection and to the display 204 with an upper rotatable connection.

In some embodiments, the display 204 rotates about a first axis of rotation 240 and a second axis of rotation 242. In some embodiments, the first axis of rotation 240 is at the connection between the connecting member 239 and the base 202. The second axis of rotation 242 is at the connection between the connecting member 239 and the display 204. Thus, by moving the connecting member 239, the position and orientation of the display 204 is adjustable, thereby allowing the user place and orient the display 204 in a position according to the user's needs.

In some embodiments, the first linkage cable 214 and the second linkage cable 216 are connected to the base member 210 and the upper member 212. As the display 204 is rotated about the first axis of rotation 240 and/or the second axis of rotation 242, the tension (e.g., the tensile force between the upper member 212 and the base member 210) in the first linkage cable 214 and/or the second linkage cable 216 may be increased. As the tension in the first linkage cable 214 and/or the second linkage cable 216 increases, rotation of the display about the first axis of rotation 240 and/or the second axis of rotation maybe resisted. This may help to stabilize the display 204 and prevent the display 204 from unintentionally rotating during use.

In some embodiments, the base member 210 and the upper member 212 include one or more connection points 244. In the embodiment shown, the upper member 212 and the lower member each include four connection points 244. In some embodiments, the first linkage cable 214 and the second linkage cable 216 are attached to the connection points 244. In the view shown, as the display 204 rotates clockwise about the first axis of rotation 240, the first linkage cable 214 is tightened, and the second linkage cable 216 is loosened. As the display 204 rotates counterclockwise about the first axis of rotation 240, the first linkage cable 214 is loosened and the second linkage cable 216 is tightened. As the display 204 rotates clockwise about the second axis of rotation 242, the first linkage cable 214 is tightened and the second linkage cable 216 is loosened. As the display 204 rotates counterclockwise about the second axis of rotation 242, the first linkage cable 214 is tightened and the second linkage cable 216 is loosened. Thus, depending on the placement and initial tension of the first linkage cable 214 and the second linkage cable 216, the range of motion of the display 204 may be customized to the user preferences and/or device specifications.

Figures 7, 8:
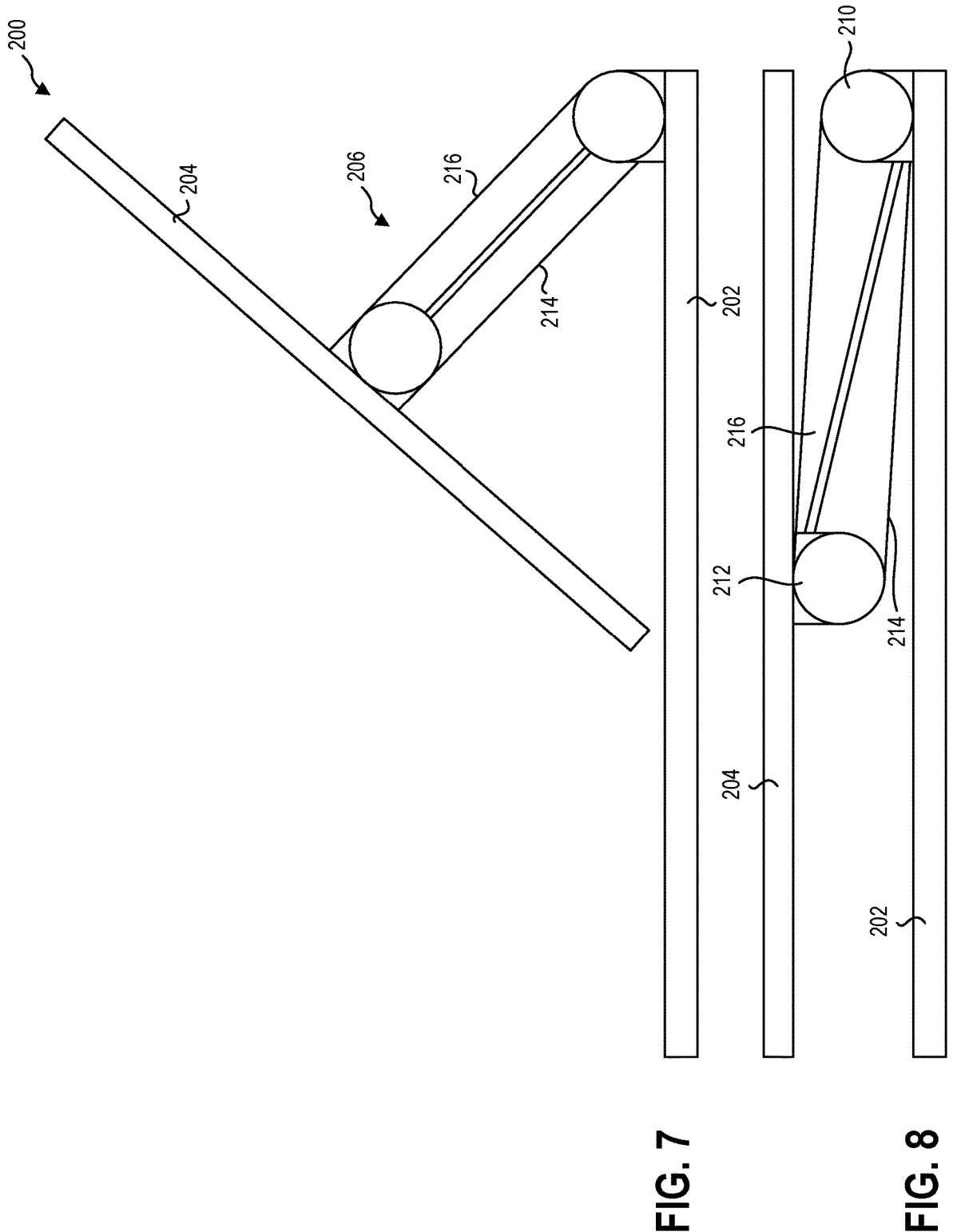
FIG. 7 is a side view of the computing device of FIG. 5 in a studio mode.
FIG. 8 is a side view of the computing device of FIG. 5 in a tablet mode.

FIG. 7 is a representation of the computing device 200 of FIG. 5 in a studio configuration, according to at least one embodiment of the present disclosure. In the view shown, the display 204 is located over a majority of the base 202 and is oriented at an angle convenient for the user to operate with an input device on the base 202 or directly on the display 204. As discussed above in relation to FIG. 6, in some embodiments, the placement and initial tension of the first linkage cable 214 and the second linkage cable 216 may affect the stability of the display 204 in the studio configuration. Thus, in some embodiments, the display 204 may touch or otherwise contact the base 202, thereby stabilizing the display 204 from downward movement. In some embodiments, the display 204 may but fully supported by the hinge 206 and may not move or otherwise contact the base 202 during use. In some embodiments, the display 204 is movable between the closed mode shown in FIG. 5, the laptop mode shown in FIG. 6, and the studio mode shown in FIG. 7.

FIG. 8 is a representation of the computing device 200 of FIG. 5 in a tablet configuration, according to at least one embodiment of the present disclosure. In the tablet configuration, the display 204 is parallel to the base 202. In some embodiments, tension in the first linkage cable 214 and the second linkage cable 216 may be sufficient to keep the base member 210 from contacting the display 204 and/or the upper member 212 from contacting the base 202. In some embodiments, the tension in the first linkage cable 214 and the second linkage cable 216 may be loose enough that the base member 210 contacts the display 204 and the upper member 212 contacts the base 202.

Figure 9:
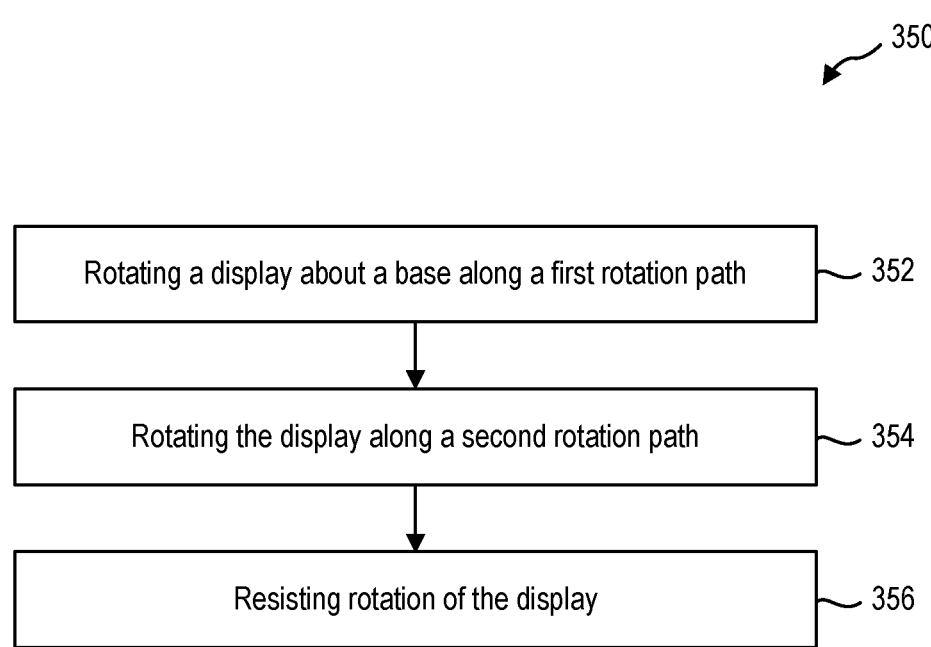
FIG. 9 is a representation of a method for controlling rotation of a computing device, according to at least one embodiment of the present disclosure.

FIG. 9 is a representation of a method 350 for controlling rotation of a computing device, according to at least one embodiment of the present disclosure. The method 350 includes rotating a display about a base along a first rotation path at 352. The display is further rotated along a second rotation path at 354. Rotation of the display is resisted about the second rotational path at 356. In some embodiments rotating the display along the first rotation path causes the rotation along the second rotation path. In some embodiments, resisting rotation of the display includes stabilizing the display during use by a user.

INDUSTRIAL APPLICABILITY

This disclosure generally relates to devices, systems, and methods for hinges for computing devices. Computing devices may be used in a variety of modes and/or configurations. For example, a computing device may include a laptop mode, where a base, such as a keyboard, may be located in front of a display, and a viewing angle of the display may be convenient for a user to view while typing on a keyboard and seated back from the computing device (such as generally vertically, or between 75° and 105°). In a studio mode, the display may be located over the top of the base and may be convenient for a user to interact with (e.g., touch a touchscreen display using a finger or a stylus). In some embodiments, the computing device further moves into a tablet mode. In the tablet mode, the display may cover an entirety of the base and the display may have a very low angle, such as an angle of less than 10°.

To move between the laptop mode and the studio mode, a lower part of the display (e.g., the part of the display closest to the base) may be disconnected from the base and moved relative to the base. A hinge may move the display relative to the base. The hinge may include a connecting portion that connects the display to the base. The connecting portion may connect to the display at a center of the display. Thus, as the display moves relative to the base, the viewing angle of the display may be adjusted.

In some embodiments, the attachment between the connecting portion and the display is not be a rigid connection (e.g., a loose connection). Thus, in the studio mode, the lower part of the display may rest on the base. However, a loose connection may cause the display to rotate or "flop" backwards during use or with a force applied to the upper portion of the display. This may be frustrating to the user and may result in unstable interaction with the display and/or stable interaction with the display across only a portion (e.g., the lower portion) of the display.

In some embodiments, a hinge between the base and the display includes a connection to the display that is stiff, such that the display may maintain a viewing angle with respect to the user. In this manner, regardless of the position of the display relative to the base, the display may remain stable across an entirety of the display. In other words, the upper portion of the display may remain stable (e.g., maintain a stable viewing angle) during use or with a force applied to the upper portion of the display. A stable upper portion of the display may result in an increased user experience and decreased user frustration.

In some embodiments, the hinge is a four-body hinge. The hinge may include a base member connected to the base and an upper member connected to the display. In some embodiments, the base member is rigidly (e.g., fixedly) connected to the base. In some embodiments, the base member is rotationally connected to the base. In some embodiments, the upper member is rigidly (e.g., fixedly) connected to the base. In some embodiments, the upper member is rotationally connected to the base.

A first linkage may connect the base member to the upper member and a second linkage may connect the base member to the upper member. The first linkage and the second linkage may provide support to the display as the display moves between the laptop mode and the display mode. In some embodiments, each side (e.g., each lateral side adjacent to the front and/or the rear of the computing device) includes a four-body hinge. In other words, the hinge may include two four-body sections, one on either side of the computing device.

In some embodiments, the first linkage may connect to the base member at a front base member location and the upper member at a front upper member location. The second linkage may connect to the base member at a rear base member location and the upper member at a rear upper member location. In some embodiments, the front base member location and the rear base member location are different. In some embodiments, the front upper member location and the rear upper member location are different. In this manner, the four-body hinge may resemble a four-sided polygon, such as a quadrilateral, a rhombus, a parallelogram, a square, a diamond, a kite, or other four-sided polygon. In some embodiments, the first linkage and the second linkage are approximately parallel. In some embodiments, the first linkage and the second linkage cross at a point between the upper member and the lower member.

In some embodiments, the first linkage and the second linkage are rigid. The connection between the first linkage and the second linkage and the upper member and the lower member may be rotating connections. Thus, as the display rotates relative to the base, the first linkage and the second linkage may cause the display to change the display angle. In other words, the display may include a first rotational path and a second rotational path. The first rotational path may largely affect the position of the center of the display relative to the base. The second rotational path may largely affect the orientation of the face of the display. However, both the first rotational path and the second rotational path may affect either the position of the center of the display relative to the base and the orientation of the face of the display. In some embodiments, the first and/or the second rotational path are elliptical. In some embodiments, the first and/or second rotational path are circular.

In some embodiments, as the display rotates through the first rotation path, the display simultaneously rotates through the second rotational path. In some embodiments, the second rotational path is related to the first rotational path. In other words, as the display is rotated through the first rotational path, the members of the hinge may cause the display to be moved through the second rotational path. Because the base member, the upper member, the first linkage, and the second linkage are all rigid, they all move as a unit. Thus, because the first linkage and the second linkage connect to the display at different points, as the first linkage and the second linkage rotate about their connections at the base member, the first linkage and the second linkage may cause the display to rotate based on their connection at the upper member.

In some embodiments, the first rotational path and/or the second rotational path are affected by the length and/or positioning of the members of the four-body hinge. For example, the base member has a base member length between the base first linkage connection and the base second linkage connection. The upper member has an upper member length between the upper first linkage connection and the upper second linkage connection. The first linkage has a first linkage length and the second linkage has a second linkage. The display has a maximum extension (e.g., angle of the display in the laptop mode) and a maximum retraction (e.g., angle of the display in the studio or tablet mode). Thus, not only are the first rotational path and/or the second rotational path affected by the length and/or positioning of the members of the four-body hinge, but the maximum extension and the maximum retraction as well.

In some embodiments, the display is rotatable between the maximum extension (e.g., the laptop mode) and the maximum retraction (e.g., the studio mode). In some embodiments, the display is rotatable only between the laptop mode and the studio mode. In other words, the display may not be movable into a closed position. In some embodiments, the display is movable into a closed position, a laptop mode, a studio mode, an airplane mode, a tablet mode, and any other mode. In some embodiments, the display rotates into a studio mode, where a portion of the base is covered by the display, and a sliding connection may move the display over more, and even an entirety, of the base.

Following are a few examples of how changes to the length and/or positioning of the members of the four-body hinge may affect the rotational paths and/or maximum extension and maximum retraction. However, these examples should not be considered to limit the changes, combinations, and permutations of changes to length and/or position of the member of the four-body hinge.

In some embodiments, increasing the base member length increases the maximum extension (e.g., a larger maximum extension angle) of the display. Increasing the upper member length may decrease the maximum retraction (e.g., lower retraction angle, closer to tablet mode). In some embodiments, increasing the first linkage length (e.g., the forward linkage) decreases the maximum retraction. In some embodiments, increasing the second linkage length (e.g., the rear linkage) increases the maximum extension. In some embodiments, any combination of base member length, upper member length, first linkage length, and second linkage length allows the user and/or the developer to optimize and customize the maximum extension and/or the maximum retraction.

In some embodiments, the stiff linkage supports the display during use, and prevent it from undesirably moving and/or rotating during use. For example, a force on the upper portion of the display may place a tensile load on the first (e.g., forward) linkage and a compressive load on the second (e.g., rear) linkage. In some examples, a force on the lower portion of the display may place a compressive load on the first (e.g., forward) linkage and a compressive load on the second (e.g., rear) linkage.

In some embodiments, the first linkage and/or the second linkage is a cable (e.g., non-rigid). The upper member may include one or more upper tie-off points, and the lower member may include one or more lower tie-off points. For example, the upper member may include a circular housing including four housing elements. The cable may be secured to one or more of the housing elements.

The upper member may be rotationally connected to the display. Thus, as the display rotates, the upper member may rotate with the display. Rotating the upper member may cause the first linkage cable to wrap around a longer portion of one or more of the elements. This may increase the tension in the first linkage cable. As the display further rotates, the tension in the first linkage cable may increase to the point that rotation of the display is resisted by the tension in the first linkage cable. In some embodiments, the tension in the first linkage cable prevents the display from rotating during use, thereby preventing the display from undesirably rotating, and improving the user experience.

In some embodiments, the second linkage cable is connected to the upper member such that rotation may be resisted in the opposite rotational direction as resisted by the first linkage cable. Thus, the display may remain in a stable rotational position, regardless of with which part (e.g., upper part, lower part, central part) of the display the user interacts. In some embodiments, the second linkage cable is connected to the upper member such that rotation may be resisted in the same direction as resisted by the first linkage cable.

In some embodiments, the display is connected to the base with a connecting member. The display may have a first axis of rotation and a second axis of rotation. The first axis of rotation may be where the connecting member connects to the base. In other words, the display may rotate relative to the base about the first axis of rotation, or where the connecting member connects to the base. The second axis of rotation may be where the connecting member connects to the display. In other words, the display may rotate about the second axis of rotation, or about the connection between the connecting member and the display.

In some embodiments, the display independently rotates about the first axis of rotation and the second axis of rotation. In other words, rotation about the first axis of rotation may not affect rotation about the second axis of rotation and rotation about the second axis of rotation may not affect rotation about the first axis of rotation.

In some embodiments, the first linkage resists rotation about the second axis of rotation and the second linkage may resist rotation about the first axis of rotation. In this manner, rotation may be controlled about both the first axis of rotation and the second axis of rotation. In some embodiments, the first linkage and/or the second axis of rotation resists rotation about the first axis of rotation and about the second axis of rotation. In some embodiments, increasing resistance about the second axis of rotation simultaneously resists rotation about the first axis of rotation.

In some embodiments, the display rotates between a fully closed position (e.g., the face of the display facing and adjacent to the input of the base) and a tablet mode. In some embodiments, the display rotates through a display mode, a studio mode, an airplane mode, and a tablet mode. In this manner, the user may use the computing device in many different modes, configurations, and in many different locations.

Below are sections of computing devices and methods according to the present disclosure.

1. A computing device, comprising:

a base (102);

a display (104) rotatable relative to the base;

a hinge (106) connecting the base and the display, the hinge including:

a base member (110) connected to the base;

an upper member (112) connected to the display;

a first linkage (114) connecting the base member to the upper member; and a second linkage (116) connecting the base member to the upper member.

2. The computing device of section 1, wherein the display rotates with a first rotational path (118) of a center (122) of the display and a second rotational path (120) of an edge (136) of the display.

3. The computing device of section 0, wherein the first rotational path is based on a first connection of the first linkage to the base member and the second linkage to the base member.

4. The computing device of section 0 or section 3, wherein the second rotational path is based on a second connection of the first linkage to the upper member and the second linkage to the upper member.

5. The computing device of any of sections 0-4 wherein the first rotational path and the second rotational path are elliptical.

6. The computing device of any of sections 1-5, wherein the base member is rotationally fixed to the base.

7. The computing device of any of sections 1-6, wherein the upper member is rotationally fixed to the display.

8. The computing device of any of sections 1-7, wherein the first linkage is connected to the base member at a first base member location and wherein the second linkage is connected to the base member at a second base member location different from the first base member location.

9. The computing device of section 8, wherein the first linkage is connected to the upper member at a first upper member location and wherein the second linkage is connected to the upper member at a second upper member location, and an upper distance between the first upper member location and the second upper member location is different than a base member distance between a first base member location and a second base member location.

10. The computing device of any of sections 1-9, wherein the display is rotatable between a laptop mode and a studio mode.

11. A computing device, comprising:
    abase (102);
    a display (104) rotatable relative to the base;
    a hinge (106) connecting the base and the display, the hinge including:
       a connecting member (239) connecting the display to the base;
       a base member (110) connected to the base;
       an upper member (112) connected to the display;
       a first linkage cable (214) connecting the base member and the upper member; and
       a second linkage cable (216) connecting between the base member and the upper member.

12. The computing device of section 0, wherein the display includes a first axis of rotation (240) at the upper member and a second axis of rotation (242) at the base member.

13. The computing device of section 0, wherein a rotation about the first axis of rotation in a first direction places a tensile force on the first linkage cable.

14. The computing device of section 0, wherein the tensile force resists the rotation about the first axis of rotation of the display.

15. The computing device of any of sections 0-14, wherein a rotation about the second axis of rotation in a second direction of rotation places a tensile force on at least one of the first linkage cable and the second linkage cable.

16. The computing device of any of sections 0-15, wherein the connecting member is connected to the display with an upper rotatable connection and the base with a base rotatable connection.

17. The computing device of any of sections 0-16, wherein the upper member is rotationally connected to the display.

18. A method for controlling rotation of a computing device, comprising:
    rotating a display (104) about a base (102) along a first rotation path (118);
    rotating the display along a second rotation path (120); and
    resisting rotation of the display along the second rotation path.

19. The method of section 0, wherein rotating the display along the first rotation path causes the rotation of the display along the second rotation path.

20. The method of section 0 or section 19, wherein resisting rotation includes stabilizing the display during use.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device, comprising:
a base;
a display rotatable relative to the base;
a hinge connecting the base and the display, the hinge including:
    a base member connected to the base;
    an upper member slidably connected to the display and including a rotational stop;
    a first linkage connecting the base member to the upper member;
    a second linkage connecting the base member to the upper member; and
    a rotational receiver on the first linkage configured to receive the rotational stop and configured to limit a rotational range of motion of the display relative to the first linkage in a first direction.

2. The computing device of claim 1, wherein the display rotates with a first rotational path of a center of the display and a second rotational path of an edge of the display.

3. The computing device of claim 2, wherein the first rotational path is based on a first connection of the first linkage to the base member and the second linkage to the base member.

4. The computing device of claim 2, wherein the second rotational path is based on a second connection of the first linkage to the upper member and the second linkage to the upper member.

5. The computing device of claim 2, wherein the first rotational path and the second rotational path are elliptical.

6. The computing device of claim 1, wherein the upper member is rotationally connected to the display.

7. The computing device of claim 1, wherein the first linkage is connected to the base member at a first base member location and wherein the second linkage is connected to the base member at a second base member location different from the first base member location.

8. The computing device of claim 7, wherein the first linkage is connected to the upper member at a first upper member location and wherein the second linkage is connected to the upper member at a second upper member location, and an upper distance between the first upper member location and the second upper member location is different than a base member distance between a first base member location and a second base member location.

9. The computing device of claim 1, wherein the display is rotatable between a laptop mode and a studio mode.

10. The computing device of claim 1, the hinge further comprising:
a connecting member connecting the display to the base.

11. The computing device of claim 10, wherein the display includes a first axis of rotation at the upper member and a second axis of rotation at the base member.

12. The computing device of claim 11, wherein a rotation about the first axis of rotation in a first direction places a tensile force on a first linkage cable.

13. The computing device of claim 12, wherein the tensile force resists the rotation about the first axis of rotation of the display.

14. The computing device of claim 11, wherein a rotation about the second axis of rotation in a second direction of rotation places a tensile force on at least one of a first linkage cable and the second linkage cable.

15. The computing device of claim 10, wherein the connecting member is connected to the display with an upper rotatable connection and the base with a base rotatable connection.

16. The computing device of claim 10, wherein the upper member is rotationally connected to the display.

17. A method for controlling rotation of the computing device of claim 1, comprising:
rotating the display about the base along a first rotation path;
rotating the display along a second rotation path; and
resisting rotation of the display along the second rotation path.

18. The method of claim 17, wherein rotating the display along the first rotation path causes the rotation of the display along the second rotation path.

19. The method of claim 17, wherein resisting rotation includes stabilizing the display during use.

* * * * *